April 8, 1952     J. S. BEECHLER     2,591,769
FLEXIBLE COUPLING
Filed March 22, 1947     2 SHEETS—SHEET 1
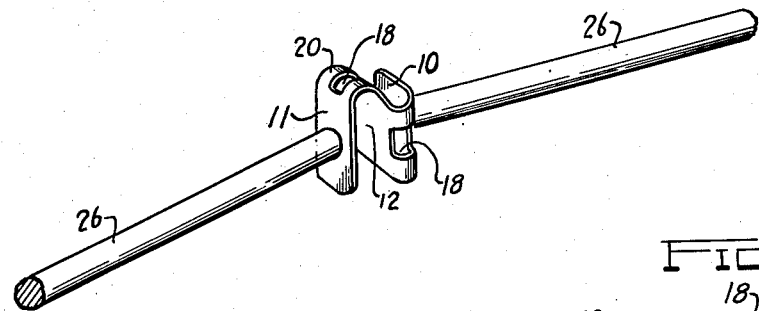
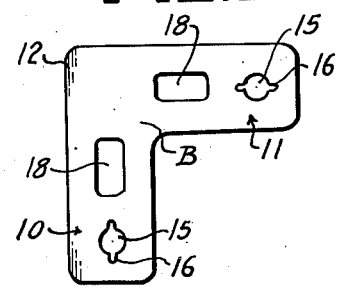
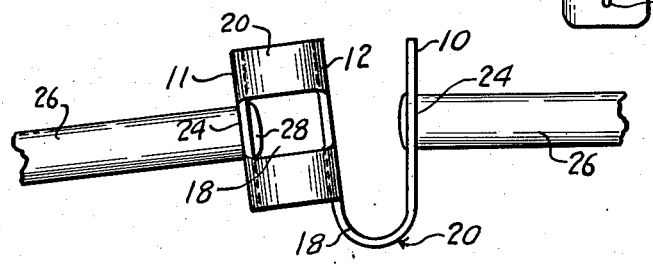
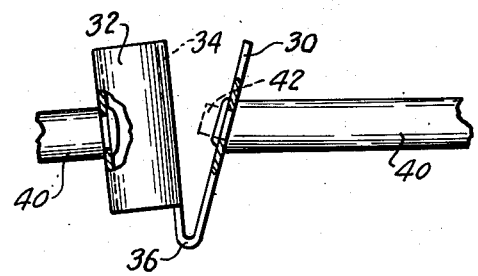
INVENTOR.
Jack S. Beechler
BY
ATTORNEYS April 8, 1952 J. S. BEECHLER 2,591,769
FLEXIBLE COUPLING
Filed March 22, 1947 2 SHEETS—SHEET 2
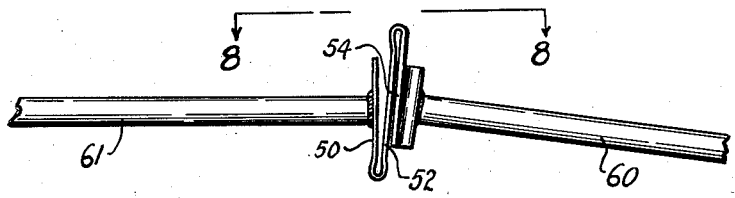
FIG. 9.
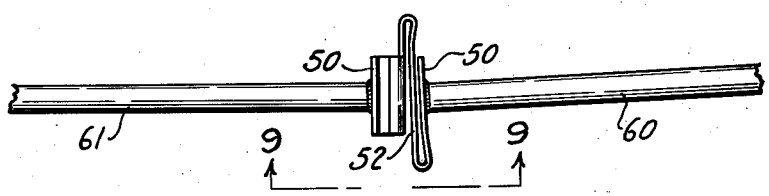
FIG. 8.
FIG. 7.
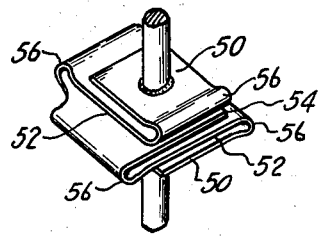
FIG. 10.
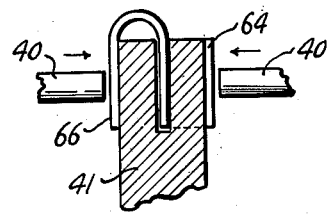
FIG. 6.
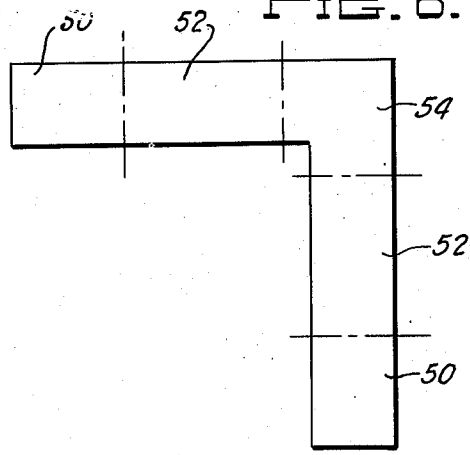
FIG. 11.
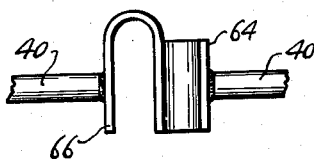
INVENTOR
Jack S. Beechler
Barnes, Kisselle, Laughlin & Raisch
BY
ATTORNEYS Patented Apr. 8, 1952

2,591,769

UNITED STATES PATENT OFFICE 2,591,769

FLEXIBLE COUPLING

Jack S. Beechler, Detroit, Mich.

Application March 22, 1947, Serial No. 736,564

5 Claims. (Cl. 64—15)

This invention relates to a flexible coupling for rotatable shafts, and has particularly to do with a device for connecting rotatable shafts to compensate for variations in alignment of the shafts while connecting them in a way that will permit a torque to be transmitted from one to the other.

It is an object of the invention to provide a flexible coupling which is extremely inexpensive, and which can be readily adapted to the low-cost requirements of present production methods, both from the point of view of initial cost and installation. The device to be described is particularly adaptable to use on control rods for instrument panels, and the like, where manual rotation occurs, but it will have application wherever rotating shafts are connected and where misalignment is desired or apt to result due to shifting of parts in assembly or in use.

Other objects of the invention will be apparent as the description progresses:

In the drawings:

Figure 1 is a perspective view showing the flexible coupling mounted between two rotatable shafts.

Figure 2 is a plan view of a blank used to make the flexible coupling.

Figure 3 illustrates the formation of the end of a shaft prior to its attachment to the coupling.

Figure 4 is an enlarged plan view of Figure 1 illustrating the manner in which angular compensation is accomplished.

Figure 5 is a view similar to Figure 4 illustrating a modified type of coupling and attachment.

Figures 6, 7, 8 and 9 illustrate the blank and various positions of a modified version of the device wherein each wing has two folds. Lines 8—8 and 9—9 on Figures 9 and 8 respectively show the relation of the two views.

Figure 10 illustrates a modified method of attaching shafts.

Figure 11 is a view of a completed joint made according to Fig. 10.

In Figure 2 an L-shaped blank B has two legs 10 and 11 and a central or corner portion 12. Each leg is punched at 15 to provide a round hole with diametrically opposed notches 16. Each leg is punched to provide an elongated hole 18 between the end and the corner. The material from which the blank is formed is preferably spring stock which may be heat treated to provide resilience. The invention contemplates any resilient or spring material.

To form the flexible coupling, each leg is bent upon itself so that the portion which was formerly outwardly extending lies over the corner or central portion 12. One leg is bent to one side of the corner portion and the other leg is bent to the other side. Each leg is connected to the corner portion by a rounded bight 20, Figures 1 and 4.

When formed, the coupling may be described as a combination of two U-shaped members having one leg in common, the other legs lying on opposite sides of the common leg at right angles to each other.

The holes 15 in the legs 10 and 11 are adapted to receive a reduced end 24 of a shaft 26. In joining the shaft to the coupling, the end 24 is passed through the hole 15 after which it is upset to provide a locking portion 28 (Fig. 4) which projects over the margins of the hole 15, and which will also flow into the notches 16 to prevent relative rotation between the shaft 26 and the leg member to which it is connected. The upsetting action can be accomplished by inserting the tip of the rod while hot and striking it a sharp blow with the hammer. It is preferably accomplished by inserting the rod cold and heating it with the electrode of a welding machine to create heat while supplying upsetting force.

It is preferred in this construction that the projection 24 have a fairly snug fit with the sides of the hole 15 with the exception of the notches 16. Other out of round holes might be used but a feature of the present construction is that the notches 16 are positioned so that the structure will not be weakened by too much narrowing at any one point.

When both rods 26 are assembled, a flexible coupling is provided. As shown in Figure 4, angular compensation between the shafts in the position shown is provided by the bending of the bight 20 adjacent leg 10. Upon rotation through 90°, the bending would be transmitted to the bight 20 adjacent leg 11. Throughout the entire movement there is a gradual transference of bending from one wing to the other. The apertures 18 serve to reduce the bending resistance at the bight without materially reducing the capacity of the device to transmit torque.

In the modification shown in Figure 5, two wings 30 and 32 extend in a V-shaped manner from a common portion 34. The device may be described as two V-shaped members having one leg in common and the other legs disposed on the opposite sides of the common leg at right angles to each other and at an angle to the common leg. The bent portion 36 in Figure 5 is preferably solid as distinguished from the modification of Figure 1, in order that the bending will take place in a distributed area of the legs 30 and 32 thereby reducing the strain at the sharp angle of the V.

In Figure 5 the shafts 40 are provided with a tip 42 reduced in cross section and disposed at an angle to the axis of the shaft. Thus when the extending portion 42 is upset, as previously described in connection with Figure 1, the wings 30 and 32 will lie flat against the shoulder of the shafts which in normal position are in alignment. The open angle of the wings 30 and 32 of Figure 5 makes it very easy to insert an upsetting tool without distortion of the coupling. The action of the embodiment of Figure 5 is the same as that of Figure 4 with the exception, as previously stated, that the bending is distributed more through the wings 30 and 32 between the angle of the V and the shaft.

Figures 6 to 9 illustrate a modified construction. The L-shaped blank as shown in Figure 6 has longer legs than that shown in Figure 2. These legs are folded on themselves to provide two bends in each wing lying on opposite sides of the common portion. Thus each leg has an attaching portion 50, an intermediate leaf portion 52, and a corner or common portion designated 54.

In forming these portions to the completed piece of Figure 7, a slight radius 56 is preferably provided at each bend. The rounded portion as shown has a diameter greater than the thickness between the leaves of the unit. It would be possible with some materials to fold the legs directly with no radius.

In Figures 8 and 9 the device of Figure 7 is shown in operation with shafts 60 and 61 attached as previously described in relation to Figure 4. The operation of this modified form is somewhat different in that the various portions are closer together, and it is possible for one leaf 50 to bottom against the intermediate leaf 52 in the compression part of the movement, as shown in Figure 8, while leaf 52 opens from the central portion. As shown in Figure 9, the intermediate leaf 52 bottoms against the central portion 54 when the other side is opening.

This modification serves to provide a slightly smoother operation with more positive torque in some applications of the device.

In Figure 11 is found a completed joint of the type illustrated in Figures 1 and 4 in which shafts 40 are welded directly to the outer wings 64 and 66 of the coupling. The manner of this joining is illustrated in Figure 10. A slotted block 41 of hard conductive material such as welding electrode metal is inserted between the wings and center portion of the coupling to serve as a combination anvil and conductive shunt. The shafts 40, each being attached to one side of a welding circuit are brought directly up to the unperforated wings. The welding circuit is completed between the shafts through the shunt block 41 and the ends are resistance or projection welded to the wings. The series arrangement between the shafts insures a positive weld at each end. I have found that this provides a very serviceable weld which does not interfere with the operation of the joint. This method of attachment of the rods is fast and inexpensive and could be applied to any of the above described modifications.

What I claim is:

1. A torque transferring device including a flexible coupling element of resilient sheet material comprising a central portion, a wing portion on opposite sides of the central portion, one wing portion connecting to the central portion along one edge of the central portion, the other wing portions connecting to the central portion along another edge of the central portion at an angle to the first connecting edge, said wings being apertured in an out-of-round hole, and rotatable members on each side of said element having portions inserted through said apertures, and headed over to lock against withdrawal and relative rotation with the respective wings.

2. A torque transferring device including a flexible coupling element of resilient sheet material comprising a central portion, a wing portion on opposite sides of the central portion, one wing portion connecting to the central portion along one edge of the central portion, the other wing portion connecting to the central portion along another edge of the central portion at an angle to the first connecting edge, said wings having a round hole and notches in the circumference thereof, and rotatable members on each side of said element having round projections inserted through said apertures in a fairly snug fit and upset to flow over the margin of said hole and into said notches.

3. A torque transferring device including a flexibe coupling element of resilient sheet material comprising a central portion, a wing portion on opposite sides of the central portion, one wing portion connecting to the central portion along one edge of the central portion, the other wing portion connecting to the central portion along another edge of the central portion at an angle to the first connecting edge, the wings being disposed at an angle to the plane of the central portion, rotatable members on each side of said element, and portions on the members disposed at an angle to the axis of the members passing through said wings normal thereto and locked in place.

4. A flexible coupling element of resilient sheet material comprising a central portion, a wing portion on opposite sides of the central portion, a bight portion connecting one wing portion to the central portion along one edge of the central portion, a bight portion connecting the other wing portion to the central portion along another edge of the central portion at an angle to the first connecting edge, each bight portion being apertured between the edges thereof to reduce the amount of metal therein thus facilitating bending of the bight without reducing the torque transmitting capacity.

5. A device for transferring motion comprising two rotary shafts subject to being disposed at angles to each other and a universal type of coupling between the two shafts comprising a single piece of material of sheet stock possessing spring characteristics, said piece having an intermediate uniplanar body portion, a uniplanar wing on one side of the body portion connected to one edge of the body portion by a bend in the material and which is rigidly connected to one of the rotary shafts independently of the central portion, and a uniplanar wing on the other side of said body portion connected to the body portion by a bend in the material at right angles to the first bend and connected rigidly to the other rotary shafts independently of the central portion, said bends in the material comprising bight portions of uniform thickness, each of said shafts being connected to the respective wings in a portion piercing the wing and a headed portion lying inside each wing.

JACK S. BEECHLER.

REFERENCES CITED

The following references are of record in the file of this patent:

UNITED STATES PATENTS

| Number | Name | Date |
|---|---|---|
| 1,042,885 | Budd et al. | Oct. 29, 1912 |
| 1,557,958 | Anderson | Oct. 20, 1925 |
| 1,819,281 | Dexter | Aug. 18, 1931 |
| 2,246,750 | Murphy | June 24, 1941 |
| 2,433,791 | Smith | Dec. 30, 1947 |

FOREIGN PATENTS

| Number | Country | Date |
|---|---|---|
| 570,282 | Germany | 1933 |